United States Patent [19]

Aoki

[11] Patent Number: 5,729,255
[45] Date of Patent: Mar. 17, 1998

[54] IMAGE EDIT METHOD AND APPARATUS HAVING ALARM INDICATION

[75] Inventor: Yasuo Aoki, Yokohama, Japan

[73] Assignees: Nikon Corporation, Tokyo, Japan; Nikon Systems Inc., Yokohama, Japan

[21] Appl. No.: 529,721

[22] Filed: Sep. 18, 1995

[30] Foreign Application Priority Data

Sep. 22, 1994 [JP] Japan ................... 6-227977

[51] Int. Cl.$^6$ ................... G06T 3/40
[52] U.S. Cl. ................... 345/128; 345/132
[58] Field of Search ................... 395/128, 133, 395/138, 139, 342, 347, 348, 352; 345/118, 121, 127, 131, 132

[56] References Cited

U.S. PATENT DOCUMENTS

| | | | |
|---|---|---|---|
| 4,686,522 | 8/1987 | Hernandez et al. | 395/347 X |
| 5,404,442 | 4/1995 | Foster et al. | 395/348 |
| 5,434,964 | 7/1995 | Moss et al. | 395/342 |
| 5,444,550 | 8/1995 | Enokida et al. | 358/453 |

FOREIGN PATENT DOCUMENTS

| | | |
|---|---|---|
| 401147777A | 6/1989 | Japan . |
| 402239957A | 9/1990 | Japan . |
| 404024771A | 1/1992 | Japan . |
| 404100376A | 4/1992 | Japan . |
| 407072821A | 3/1995 | Japan . |

*Primary Examiner*—Mark K. Zimmerman
*Attorney, Agent, or Firm*—Shapiro and Shapiro

[57] ABSTRACT

In an image edit apparatus for editing an image and outputting the edited image, an image can be easily edited without lowering the resolution of a printed image when the edited image is printed. A control portion controls the size of an image in correspondence with the resolution of a color printer when the image is pasted in an edit area. When an image stored in an image library is pasted on the edit area, the control portion performs conversion of the size (Lx, Ly) of the image to be pasted based on the numbers of pixels (Px, Py) of the image, the resolution (Ro) of the color printer, and the resolution (Rd) of an indication device.

8 Claims, 8 Drawing Sheets

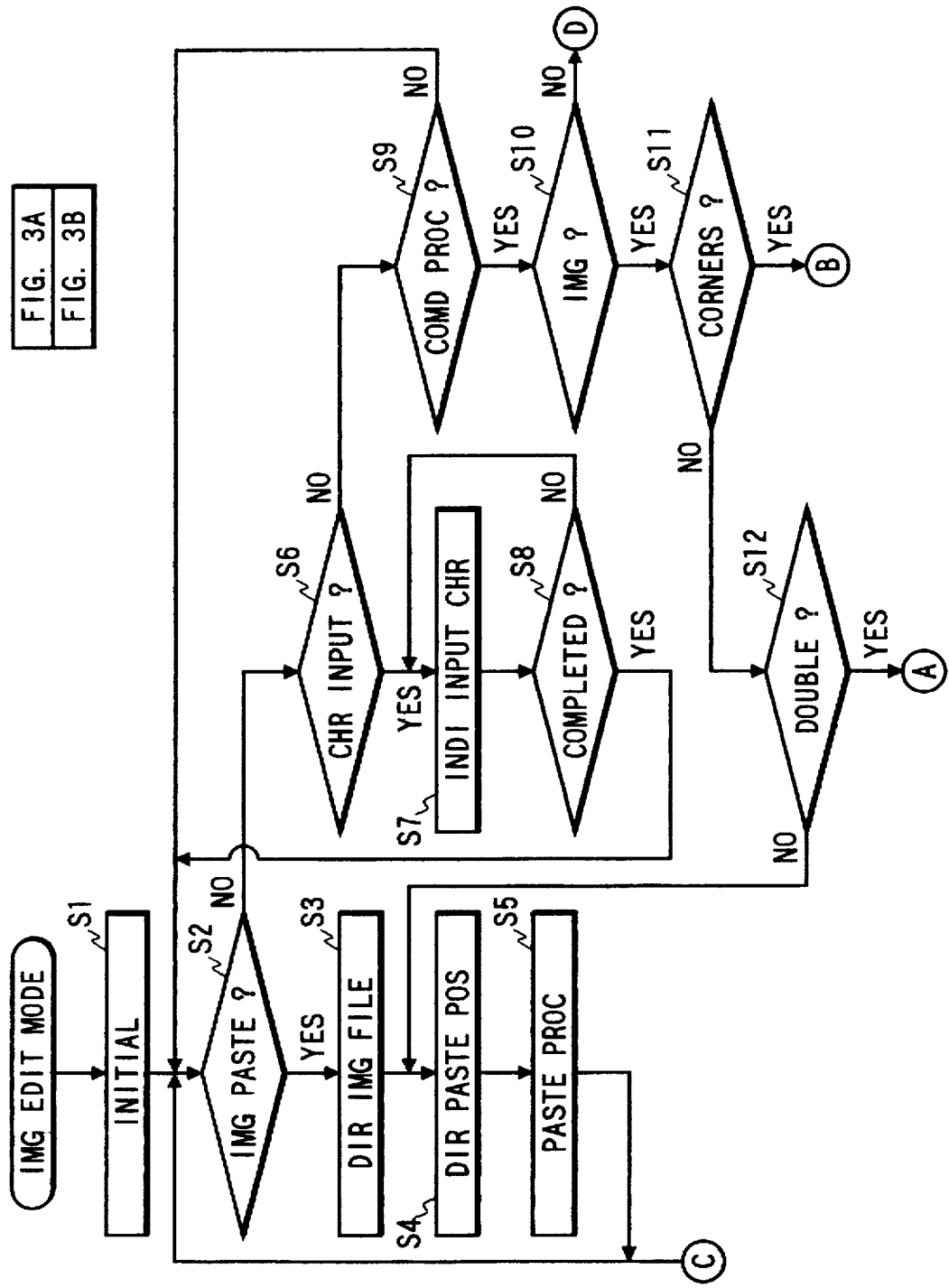

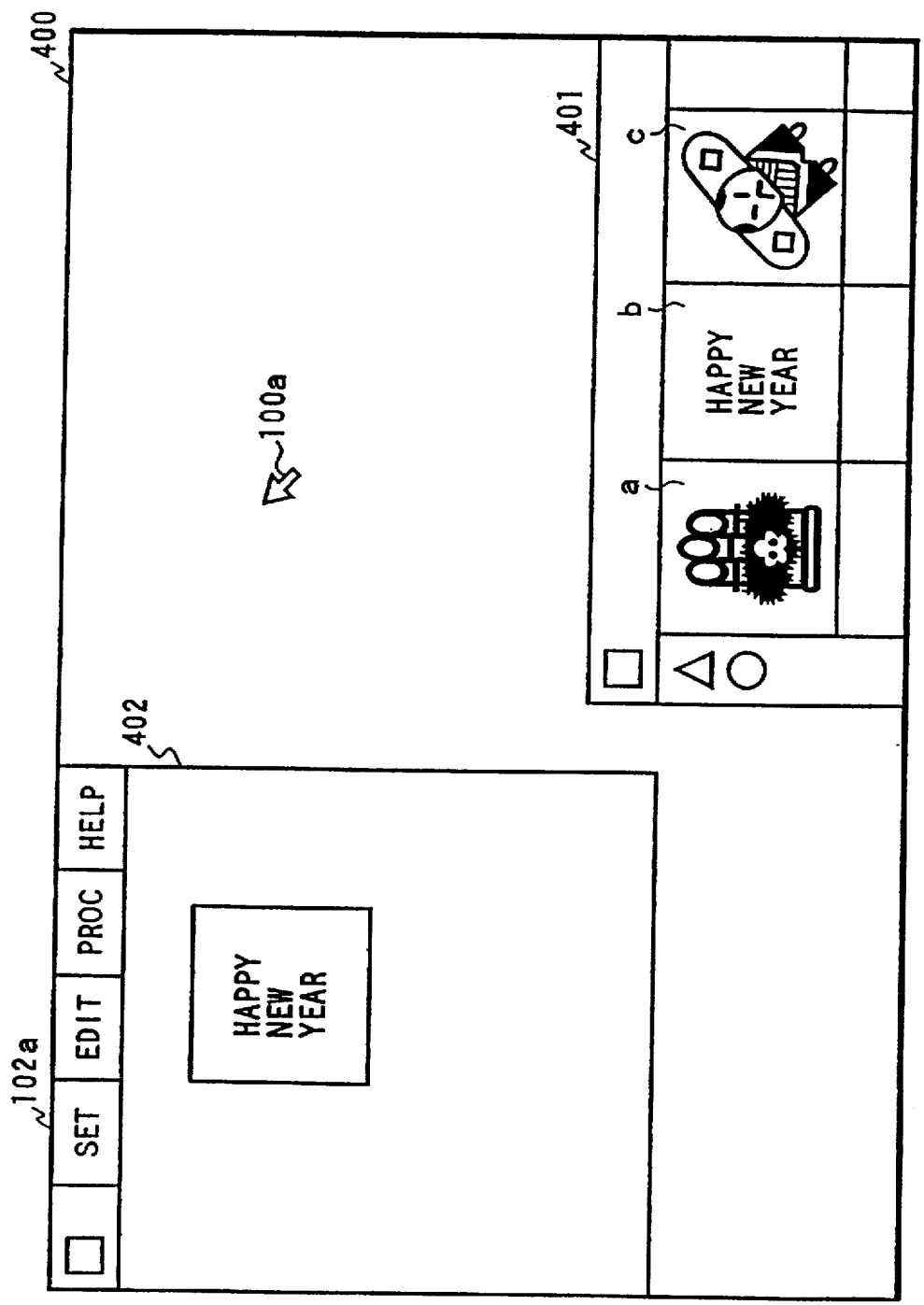

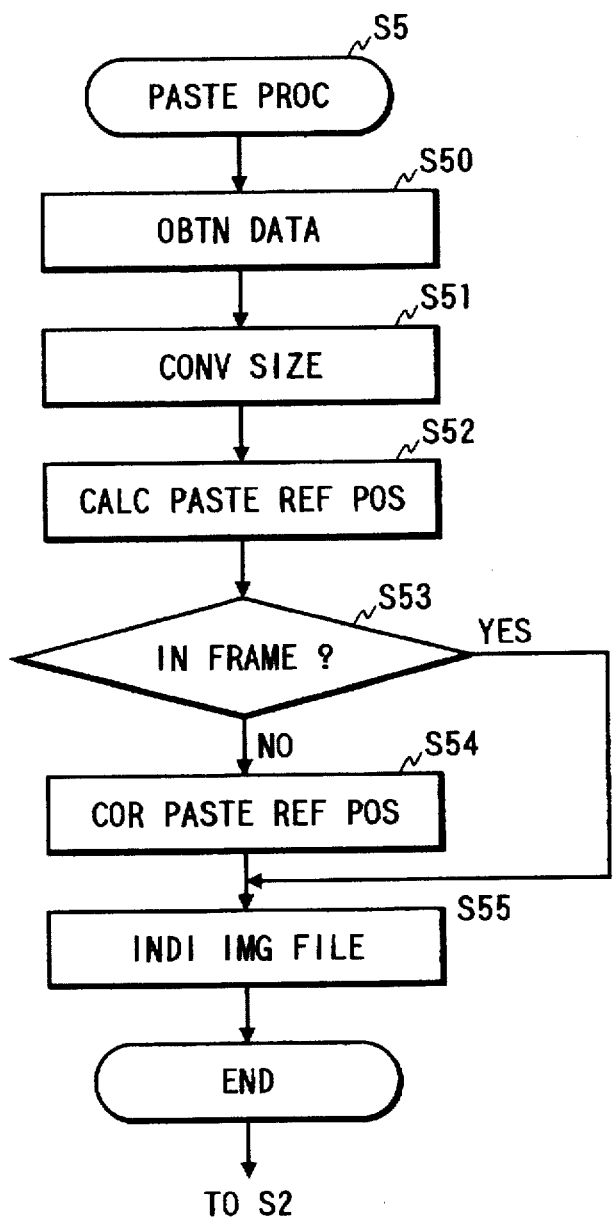

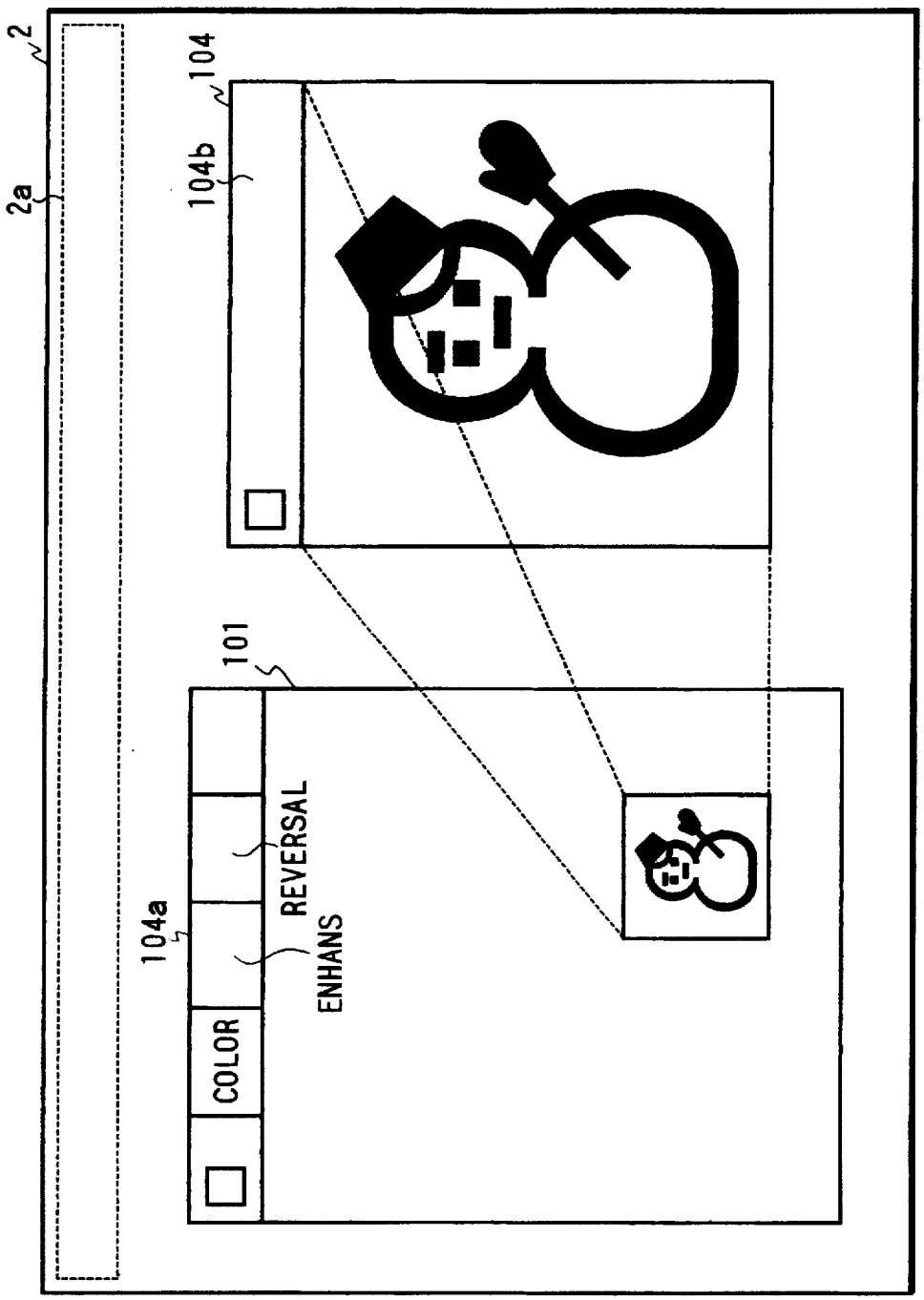

ID # 1

IMAGE EDIT METHOD AND APPARATUS HAVING ALARM INDICATION

BACKGROUND OF THE INVENTION

1. Field of the Invention

The present invention relates to an image edit apparatus and, more particularly, to an image edit apparatus which edits the layout of printed matter or an indication image plane using an image stored in an image storage medium such as a CD-ROM or an image read using an image reading device, i.e., to an apparatus which is easy to operate even for a beginner among apparatuses of this type.

2. Related Background Art

Conventionally, when an image edit operation is performed using a wordprocessor or a personal computer which uses a software program capable of an image edit operation, various types of modes are available on the basis of the control of the apparatus (hardware) and the software program. Of these types, the following two types of modes are typical ones. In the mode of the first type, an image input area is set in a character edit area, and an image is laid out in only the image area. In the mode of the second type, an area is designated in an edit area independently of a character or image, and an image is pasted or a character is input in the designated area.

The mode of the first type is not easy to use due to severe limitations on the layout regardless of difficulty of the operation. The mode of the second type is recently used since it allows easy movement of the area itself.

The apparatus of this type operates as follows in the edit operation.

(1) When an image file is pasted into an edit area, another apparatus for creating an image file creates an image file matching the size of the paste range on the edit area (at this time, image processing of, e.g., changing the resolution of the image file is performed). The paste area of the image file is prepared at a desired position on the edit area, and the created image file is pasted into the prepared area.

(2) When the pasted image file is enlarged on the edit area, the enlargement range is designated by moving the frame of the image file as desired. Thereafter, the image is indicated in the designated range by changing the resolution.

(3) The paste position of the image file on the edit area is determined with reference to the upper left coordinate position of the image file independently of the size of the image file.

(4) Even when the paste position is designated at a position where the pasted image file extends outside the edit area upon designation of the paste position, the image file is pasted with reference to the paste position without changing the paste position.

(5) When image processing such as contrast emphasis, reversal, color emphasis, and the like of the image file to be edited is performed, an image processing software program is prepared in addition to an image edit software program, and is started on the personal computer, thus executing the image processing on the image processing software program.

However, the conventional image edit operation suffers the following drawbacks.

In the case of (1), an image is edited regardless of the output operation of the edited image (e.g., when the image is to be printed on a postcard). In general, the resolution of the indication image plane of the image edit apparatus is different from that of a printing apparatus. For this reason, even when a good image is indicated on the indication device, whether or not the image file has a size that can provide a good print result cannot be confirmed until the print result of the printing apparatus is observed. Therefore, a trial print operation and an edit operation are repetitively performed until a good print result of the image is obtained. For this reason, the edit operation becomes cumbersome, and the edit cost increases in the case of a color printing apparatus.

In order to avoid such a situation, a user must buy an image processing software program which can freely change the resolution in addition to a software program capable of an image edit operation. After the resolution of the image is increased by a personal computer using this image processing software, an edit operation is performed by a personal computer using the image edit software program. The software program of this type provides a relatively large number of processing modes, but does not easily allow a user to obtain a desired image unless the user fully understands image processing. In addition, an operation required until a desired image is obtained is cumbersome. Therefore, since a user who cannot buy the image processing software program, a user who cannot fully utilize the software program, and a user who hates a cumbersome operation cannot obtain a desired image, they must repeat the above-mentioned operation.

In the case of (2), the prepared image has a fixed resolution. For this reason, since the resolution of the enlarged image is lowered, the print and edit operations must be repeated to confirm the upper limit of the enlargement factor.

In the case of (3), the lower and right sides of the image file tend to extend outside the edit area. For this reason, the paste position must be designated to prevent the image file from extending outside the edit area.

In the case of (4), upon determination of the paste position of the image file, the image file is pasted with reference to the designated position independently of the size of the image file and the range of the edit area. For this reason, the paste position must be carefully designated as in (3).

In the case of (5), an expensive image processing software program must be separately prepared, and a user must be skilled to construct a desired image.

SUMMARY OF THE INVENTION

It is an object of the present invention to provide an image edit method and apparatus, which can solve the above-mentioned problems, and can allow a simple image edit operation without impairing the appearance (in particular, the resolution) of an image and without causing an a feeling of unnatural operation.

In one embodiment of the present invention, an image is edited by an image edit method for forming, using an image edit apparatus comprising indication means for indicating (displaying) an image, an edited image file by pasting an image file into an edit area while observing the edit area indicated on the indication means, and outputting the edited image file to output means connected to the image edit apparatus, comprising:

the designation step of designating an image file to be pasted; and the determination step of determining a size of the image file to be pasted into the edit area in correspondence with a resolution of the output means using size information and resolution information of the designated image file and output resolution information of the output means.

In this case, the determination step may include the step of setting the size of the image file to be pasted, so that the resolution of the image file is not less than the resolution of the output means.

Also, the determination step may include the step of setting the size of the image file to be pasted so that the resolution of the output means is equal to the resolution of the image file.

In another embodiment, an image is edited by an image edit method for forming, using an image edit apparatus comprising indication means for indicating an image, an edited image file by pasting an image file into an edit area while observing the edit area indicated on the indication means, and outputting the edited image file to output means connected to the image edit apparatus, comprising:

the enlargement designation step of designating an enlarged size of an image file pasted in the edit area; the comparison step of comparing a resolution of the image file whose size is designated in the enlargement designation step with a resolution of the output means; and the alarm step of generating an alarm when it is determined in the comparison step that the resolution of the output means becomes higher than the resolution of the image file.

In this case, an image can also be edited by further adding: the enlargement processing step of performing enlargement processing of the designated image file to obtain an image file with the enlarged size designated in the enlargement designation step; the optimizing step of optimizing a size of the image file whose size is designated in the enlargement designation step to a size at which the resolution of the output means is equal to the resolution of the image file; the enlargement stop step of stopping enlargement processing of the image file whose size is designated in the enlargement designation step and restoring the size of the image file to a size before designation; and the selection step of selecting one of the enlargement processing step, the optimizing step, and the enlargement stop step after the alarm step.

In still another embodiment, an image is edited by an image edit method for forming an edited image file by pasting an image file into an edit area while observing the edit area indicated on indication means using an image edit apparatus comprising the indication means for indicating an image, and outputting the edited image file to output means connected to the image edit apparatus, which method has: the designation step of designating an image file to be pasted into the edit area; the paste position designation step of designating a position for pasting the image file designated in the designation step in the edit area; and the paste step of pasting the image file into the edit area using the coordinate position designated in the paste position designation step as a reference position, comprising:

the reference position offset step of offsetting the reference position as the paste position of the image file in the paste step on the basis of a size of the designated image file, the coordinate position designated in the paste position designation step, and an outer frame representing the range of the edit area so as to prevent the image file to be pasted from extending outside the outer frame.

In still another embodiment, an image is edited by an image edit method for forming, using an image edit apparatus comprising indication means for indicating an image, an edited image file by pasting an image file into an edit area while observing the edit area indicated on the indication means, and outputting the edited image file to output means connected to the image edit apparatus, comprising:

the designation step of designating an image file to be pasted into the edit area; the paste position designation step of designating a paste position where the designated image file is pasted into the edit area; the paste position offset step of offsetting the coordinate position designated in the paste position designation step on the basis of a size of the image file to be pasted so that the center of the image file coincides with the paste position; and the paste step of pasting the image file using the position offset in the paste position offset step as a reference position.

In this case, the paste position offset step may include the step of offsetting the reference position as the paste position in the paste step on the basis of the size of the designated image file, the coordinate position designated in the paste position designation step, and an outer frame indicating a range of the edit area to prevent the image file to be pasted from extending outside the outer frame, when the image file pasted at the offset paste position extends outside the outer frame indicating the range of the edit area.

In still another embodiment, an image is edited by an image edit method for forming, using an image edit apparatus comprising indication means for indicating an image, an edited image file by pasting an image file into an edit area while observing the edit area indicated on the indication means, and outputting the edited image file to output means connected to the image edit apparatus, comprising:

the size determination step of determining a size of an image file so that a resolution of the image file is equal to a resolution of the indication means when the image file pasted in the edit area is selected; and the indication step of indicating the image file in the size determined in the size determination step.

In still another embodiment, in an image edit apparatus for forming an edited image file by pasting an image file into an edit area while observing the edit area indicated on indication means for indicating an image, and outputting the edited image file to output means connected to the apparatus, which comprises: image file storage means for storing image files each having resolution information; designation means for designating an image file in the image file storage means; paste position designation means for pasting a paste position, in the edit area, of the designated image file; and edit area control means for pasting the designated image file at the paste position in the edit area, wherein when the designated image file is pasted into the edit area, the edit area control means controls a size of the image file to be pasted in correspondence with a resolution of the output means, so as to prevent a resolution of the image file pasted in the edit area from being lowered when the edited image file is output by the output means.

In this case, the edit area control means may set the size of the image file to be pasted, so that the resolution of the image file is not less than the resolution of the output means.

Also, the edit area control means may determine the size of the image file, so that the resolution of the output means is equal to the resolution of the image file.

In still another embodiment, an image edit apparatus for forming an edited image file by pasting an image file into an edit area while observing the edit area indicated on indication means for indicating an image, and outputting the edited image file to output means connected to the apparatus, comprises:

enlargement designation means for designating an enlarged size of an image file pasted in the edit area; comparison means for comparing a resolution of the image file whose size is designated by the enlargement designation means with a resolution of the output means; and alarm means for generating an alarm when the comparison means determines that the resolution of the output means becomes higher than the resolution of the image file.

In this case, the apparatus may further comprise enlargement processing means for performing enlargement processing of the designated image file to have the enlarged size designated by the enlargement designation means; optimizing means for optimizing the size of the image file whose size is designated by the enlargement designation means to a size at which the resolution of the output means is equal to the resolution of the image file; enlargement stop means for stopping the enlargement processing of the image file whose size is designated by the enlargement designation means, and restoring the image file to a size before designation; and selection means for selecting one of the enlargement processing means, the optimizing means, and the enlargement stop means after the alarm is generated by the alarm means.

In still another embodiment, in an image edit apparatus for forming an edited image file by pasting an image file into an edit area while observing the edit area indicated on indication means for indicating an image, and outputting the edited image file to output means connected to the apparatus, which has: designation means for designating an image file to be pasted into the edit area; paste position designation means for designating a paste position, in the edit area, of the image file designated by the designation means; and paste means for pasting the image file into the edit area using a coordinate position designated by the paste position designation means as a reference position, the apparatus comprises reference position offset means, arranged between the paste position designation means and the paste means, for offsetting the reference position as the paste position of the paste means on the basis of a size of the designated image file, the coordinate position designated by the paste position designation means, and an outer frame indicating a range of the edit area, so as to prevent the image file to be pasted from extending outside the outer frame.

In still another embodiment, an image edit apparatus for forming an edited image file by pasting an image file into an edit area while observing the edit area indicated on indication means for indicating an image, and outputting the edited image file to output means connected to the apparatus, comprises:

designation means for designating an image file to be pasted; paste position designation means for designating a paste position where the designated image file is pasted into the edit area; paste position offset means for offsetting the coordinate position designated by the paste position designation means on the basis of a size of the image file to be pasted, so that the center of the image file coincides with the paste position; and paste means for pasting the image file using the position offset by the paste position offset means as a reference position.

In this case, the paste position offset means may offset the offset paste position on the basis of the size of the designated image file, the coordinate position designated by the paste position designation means, and an outer frame indicating a range of the edit area so as to prevent the image file to be pasted from extending outside the outer frame, when the image file pasted at the offset position extends outside the outer frame indicating the range of the edit area.

In still another embodiment, an image edit apparatus for forming an edited image file by pasting an image file into an edit area while observing the edit area indicated on indication means for indicating an image, and outputting the edited image file to output means connected to the apparatus, comprises:

size determination means for, when an image file pasted in the edit area is selected, determining a size of the image file so that a resolution of the image file is equal to a resolution of the indication means; and indication control means for controlling the indication means to indicate the image file in the size determined by the size determination means.

In this case, the indication control means may control the indication means to indicate at least the edit area and a menu of an edit operation above the edit area in the edit operation, and when the image file pasted in the edit area is selected, the indication control means may control the indication means to indicate the image file in the size determined by the size determination means and to indicate an image processing menu in place of the menu of the edit operation.

According to the present invention, the size of an image file to be pasted into an edit area is determined in correspondence with the resolution of the output means on the basis of the size information and resolution information of the designated image file and the output resolution information of the output means.

When the enlargement operation of an image is designated in the edit area, the resolution of the image file designated in the enlargement designation step is compared with the resolution of the output means, and when the resolution of the output means becomes larger than that of the image file, an alarm is generated.

The reference position as the paste position of the image file in the paste step can be offset on the basis of the size of the designated image file, the coordinate position designated in the paste position designation step, and the outer frame indicating the range of the edit area, so as to prevent the image file to be pasted from extending outside the outer frame.

When the paste position of an image to be pasted is designated in the edit area, the designated paste position is offset on the basis of the size of the image file to be pasted so that the center of the image file coincides with the paste position, and the image file is pasted using the offset position as the reference position. Therefore, the image file is pasted to have the designated position in the edit area as the center.

When the image file pasted into the edit area is selected, the size of the image file is determined so that the resolution of the image file becomes equal to the resolution of the indication means, and the image file with the determined size can be indicated.

When the edited image is output by the output means, the edit area control means can control the size of the image file to be pasted in correspondence with the resolution of the output means when the designated image file is pasted into the edit area, so as to prevent the resolution of the image file pasted into the edit area from being lowered.

When the enlargement operation of the image file pasted into the edit area is designated, the resolution of the designated image file is compared with the resolution of the output means, and when the resolution of the output means becomes higher than the resolution of the image file, an alarm is generated.

The reference position as the paste position can be offset on the basis of the size of the designated image file, the coordinate position designated by the paste position designation means, and the outer frame indicating the range of the edit area, so as to prevent the image file to be pasted from extending outside the outer frame.

When an image file to be pasted is designated, and the paste position where the designated image is to be pasted is designated, the designated paste position is offset on the basis of the size of the image file to be pasted, so that the center of the image file coincides with the paste position, and the image file is pasted using the offset position as the reference position.

When the image file pasted into the edit area is selected, the size of the image file is determined so that the resolution of the image file becomes equal to the resolution of the indication means, and the image file with the determined size can be indicated.

BRIEF DESCRIPTION OF THE DRAWINGS

FIG. 4 is a view showing an example of the image plane of an indication device to explain the operation of the embodiment shown in FIG. 1;

FIG. 5 is a flow chart showing the image paste processing of the embodiment shown in FIG. 1;

FIG. 8 is a view showing an example of the image plane of the indication device to explain the operation of the embodiment shown in FIG. 1.

DESCRIPTION OF THE PREFERRED EMBODIMENTS

An image edit apparatus according to an embodiment of the present invention will be described below with reference to the accompanying drawings.

Figure 1:
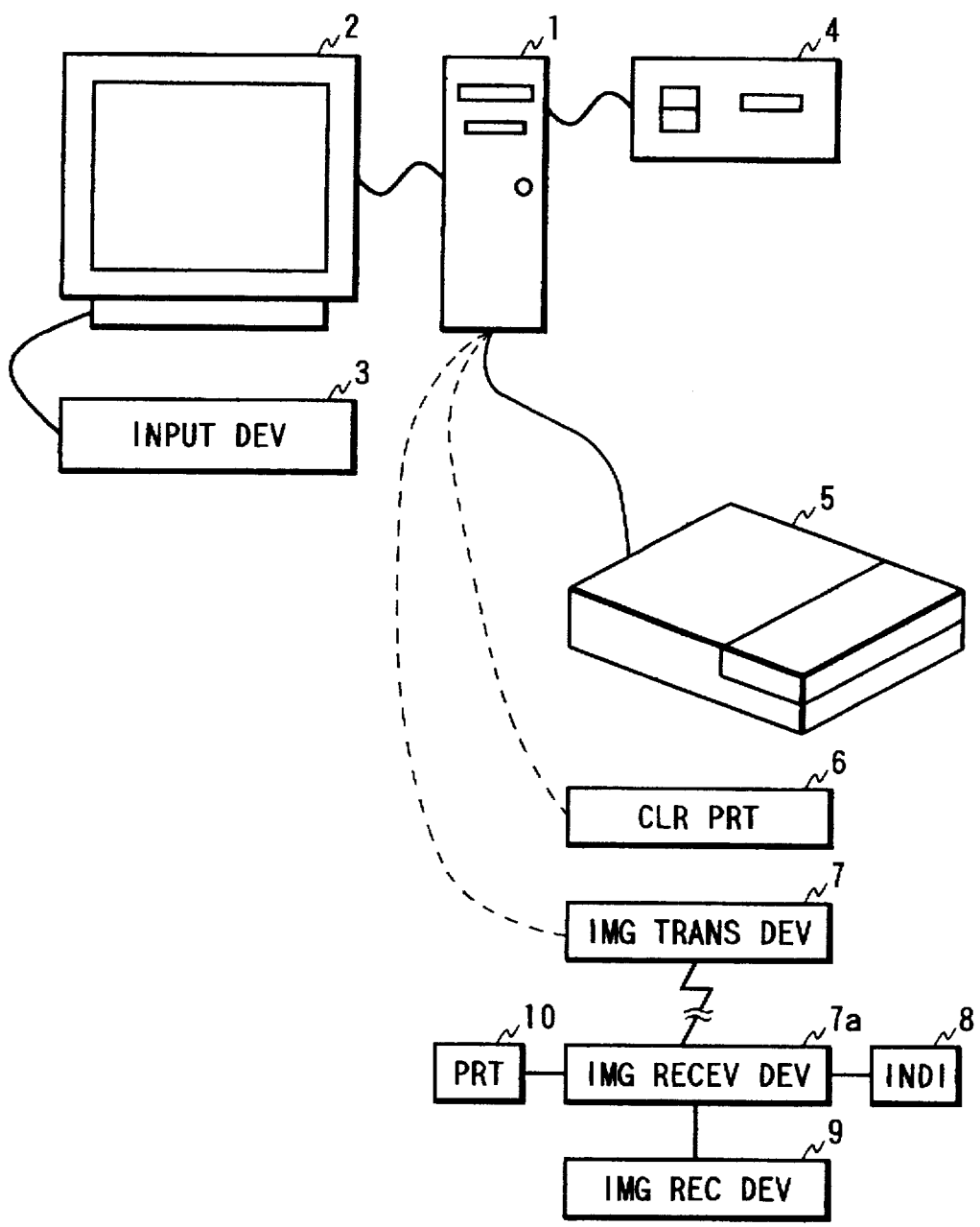
FIG. 1 is a schematic diagram showing an arrangement according to an embodiment of the present invention.

As shown in FIG. 1, the image edit apparatus comprises a personal computer 1, a TV monitor (indication device) 2 connected to the computer 1, and an input device 3 connected to the computer 1 and consisting of a keyboard and a pointing device such as a mouse (to be referred to as a mouse for shorthand hereinafter) connected to the keyboard (the apparatus of this embodiment is connected to the computer 1 via the indication device 2, as shown in FIG. 1). The computer 1 comprises a CD-ROM drive device and a floppy disk drive as devices for reading information from recording media. The computer incorporates a RAM board used as a memory area for storing an image, and a hard disk. Note that other memory devices such as a magnetooptical disk, a magnetic tape, and the like may be used as the memory. Also, as the pointing device of the input device, a track ball, joystick, or the like may be used instead.

The computer 1 is connected to a film image reading device 4 as an image pick-up (input) device. As the image pick-up device, the CD-ROM, an image scanner which is mainly used in a facsimile apparatus, and reads an image printed on a paper sheet, an OHP sheet, or the like, a computer graphics apparatus for creating an image on the indication image plane of the indication device connected to the computer, or the like may be used. As an edited image output device, a sublimation type digital color printer 5 which can print an image of the postcard size or an A5 size in full color is connected. As the output device, other devices may be used. For example, a color printer 6 whose resolution is known, an indication device 8 used when an image is indicated on a system other than the image edit apparatus, a printer 10, or an image recording device 9 may be used. An image may be transmitted to a system, which includes these devices and is set at a remote place, via an image transmitting device 7 and an image receiving device 7a, as shown in FIG. 1.

The computer 1 has a CPU and a memory which stores an image edit program for determining the operation of the CPU. The image edit apparatus basically performs an operation selected by an operator by processing it using the CPU. The memory storing the program corresponds to the hard disk, and part or whole of the program is stored on the memory upon start of the program.

The operation of the image edit apparatus of this embodiment, especially, the operation of the computer 1 (the CPU and the image edit program) will be described below.

Since the overall operation can be divided into an image pick-up mode for picking up an image to be used in an image edit operation, an image edit mode, and an image output mode, these modes will be described in turn. Note that the image edit mode can be further divided, as will be described later.

<<Image Input Mode>>

Figure 2:
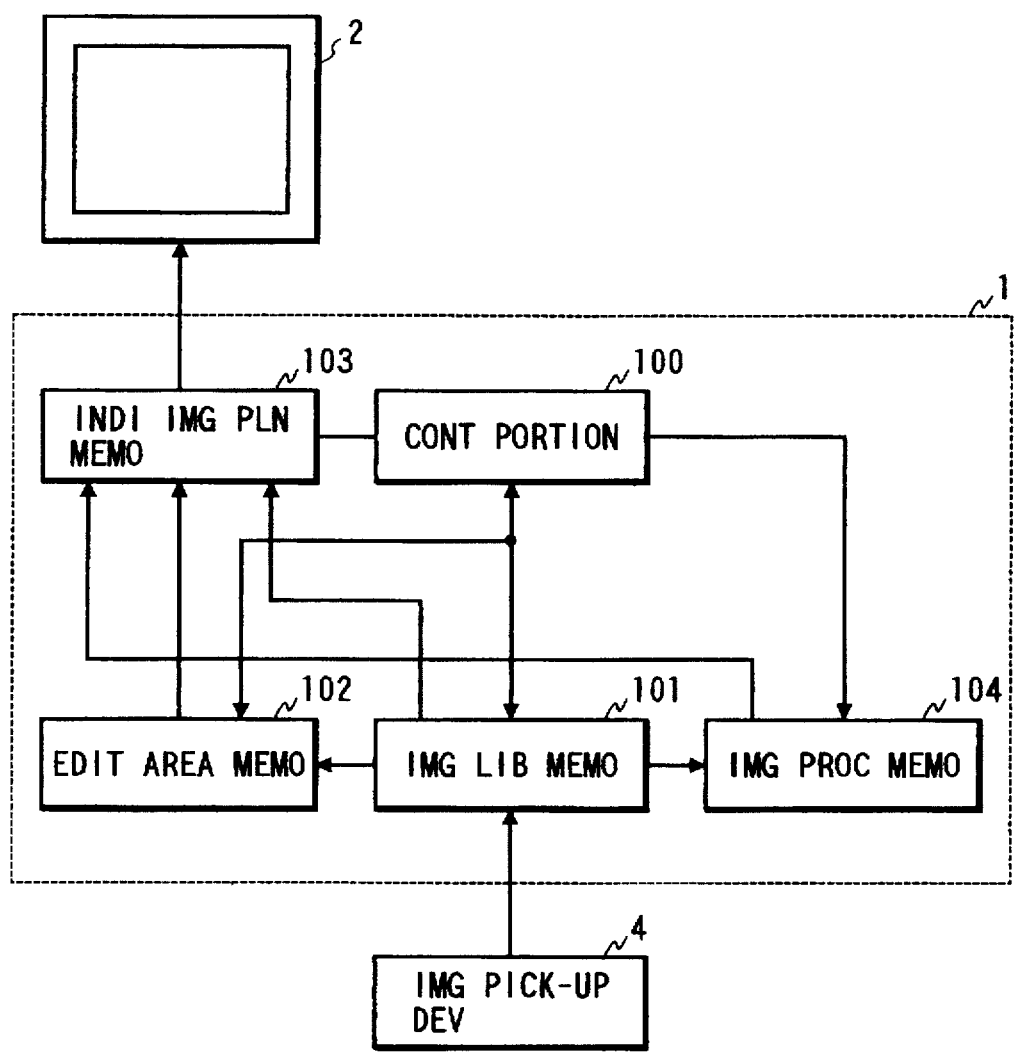
FIG. 2 is a block diagram showing the functions of the embodiment shown in FIG. 1.

FIG. 2 is a block diagram functionally showing the image pick-up mode of the image edit program.

The computer 1 has an image library memory 101 which stores an image file to be edited. In the image pick-up mode, an image to be picked up is stored in the image library memory.

When the image pick-up mode is started, the computer 1 selects an image pick-up device to be used. Choices in this case are connectable devices including the built-in CD-ROM drive. In this case, assume that the film image pick-up device 4 is selected as the image reading device, as shown in FIG. 1. When the image reading device 4 is selected, the data line between the computer 1 and the film image reading device 4 is set in an active state. As a result, the film image reading device 4 is ready to operate on the basis of an instruction from the computer 1.

The computer 1 indicates a menu on the indication device 2. An operator inserts a plate-shaped film holder set with a film into an insertion port of the film image reading device 4 in accordance with the menu guidance. With this operation, an original (film) to be read is set. Then, the film image reading device 4 is operated to read a film image. In order to identify the read image, a name is input from the input device 3.

With the above-mentioned operation, an image file which stores the input image is stored in the image library memory 101. This image file stores information such as the name, the image data, the resolution and size of the image data, and the like.

The image library memory 101 stores a plurality of image files which are prepared in advance. For this reason, as long as the prepared image files are used, the next image edit mode can be executed without performing the operation in the image pick-up mode. Note that the image library memory 101 is stored on the in a predetermined area on the hard disk in the computer 1.

<<Image Edit Mode>>

The image edit mode will be described below mainly using FIGS. 3A and 3B. The image edit mode can be further divided into an image paste mode, an image enlargement mode, and an image processing mode.

The computer 1 shown in FIG. 1 is constituted by functional blocks enclosed in a dotted line in FIG. 2 as the image edit mode. More specifically, the computer 1 comprises a control portion 100 for controlling edit and indication operations, the image library memory 101 for storing an image file to be edited, an edit area memory 102, an indication image plane memory 103, and an image processing memory 104. The image library memory 101 stores an image file picked up in the above-mentioned image pick-up mode, and image files prepared in advance for the edit mode. The edit area memory 102 serves as an area for storing an edited image file, and its memory size changes in correspondence with the size of an output medium (e.g., a paper sheet or an indication image plane) of the output device 5. The image processing memory 104 is used upon execution of image processing of an image file. The indication image plane memory 103 stores data for one image plane to be displayed on the indication image plane, and is controlled by the control portion 100. The control portion 100 superposes image data supplied from the memories 101, 102, 103, and the like, and outputs the superposed data to the indication device 2 at a predetermined timing.

Figure 3B:
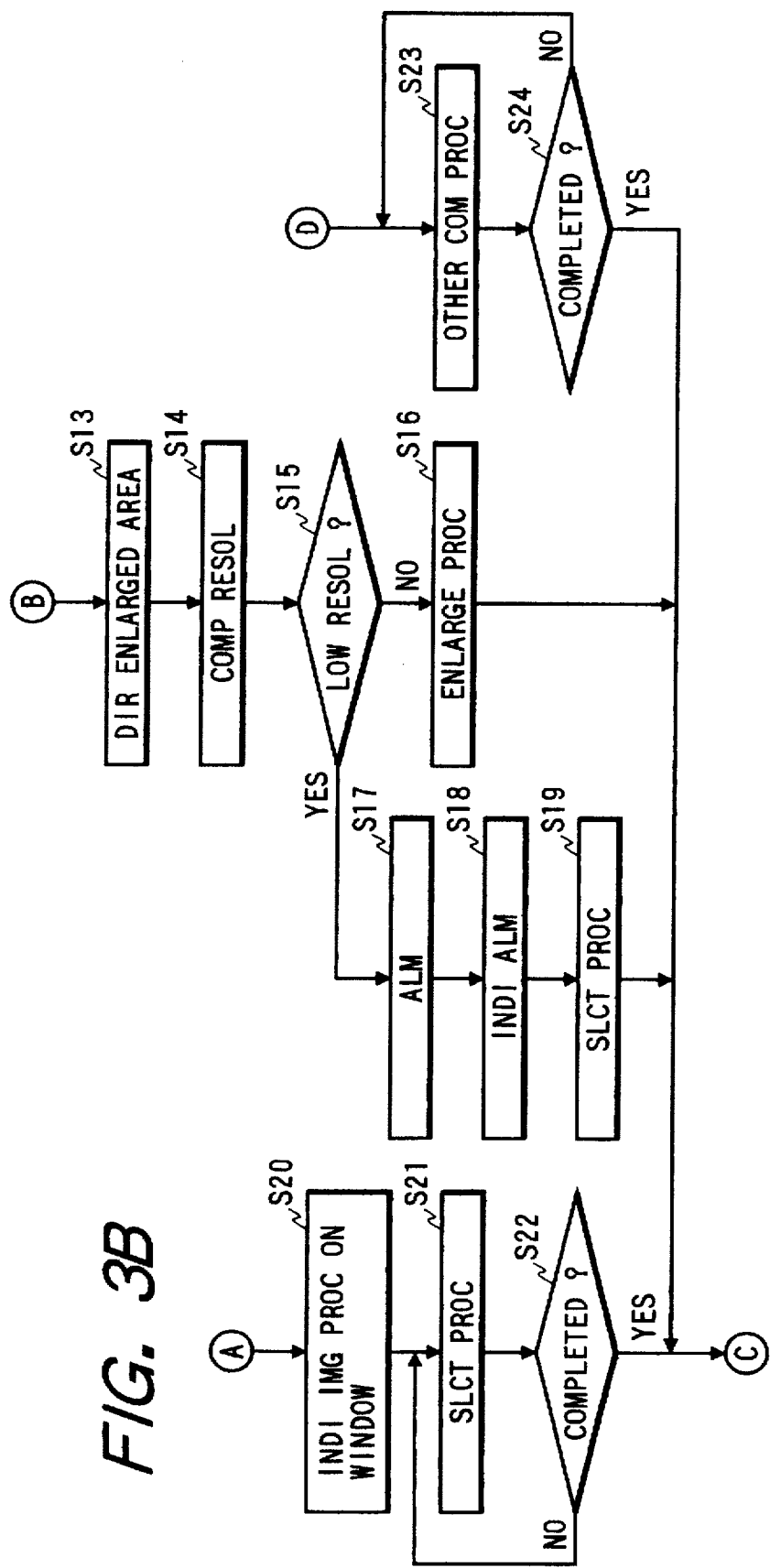
FIG. 3 is comprised of FIGS. 3A and 3B showing flow charts illustrating an example of the processing sequence of the embodiment shown in FIG. 1.

In the image edit mode with the above-mentioned functions, the edit operation is processed in, e.g., the following sequence shown in FIGS. 3A and 3B.

When the image edit mode is selected, the control portion 100 performs initialization (step S1; each step will be simply expressed as Sn hereinafter). In the initialization, as shown in FIG. 4, the contents of the edit area stored in the edit area memory 102, and the contents of the image library memory 101 for storing an image file to be pasted into the edit area are indicated at 402 and 401, respectively. At the same time, a menu bar 102a for indicating operable commands is also indicated. Referring to FIG. 4, the size of an edit area 402 indicated on an indication image plane 400 corresponds to the postcard size. As the contents of an indication portion 401 of the image library, some of a plurality of image files in the library are indicated.

Then, the size of the edit area and the output device to be used are set. When they are not set, it is determined that the operator selects the already set information (default specifications or the previously designated size and device).

A "set" command in the menu bar 102a includes an area change command. The edit area is changed using the area change command. When a predetermined command indicated on the indication image plane is selected by a pointer 100a using the mouse 3, the control portion 100 assures that an image area corresponding to the set size of the edit area is provided in the edit area memory 102. Then, the control portion 100 indicates the edit area with the changed size on the indication device 2. The image area (edit area) can be determined in correspondence with the resolutions of the image file and the output device 5. Note that the postcard size is set as a default.

Similarly, the output device 5 is selected. By selecting the output device 5 in the "set" command of the menu bar, the setting image plane of the output device 5 is indicated, and the setting operation of the output device 5 is performed on the setting image plane. The setting operation of the output device 5 includes a setting operation of the resolution of the output device. In a normal edit operation, e.g., an edit operation of a New Year's card, a printer is selected as the output device 5. Resolution data of principal printers are input in advance, and the setting operation requires only selection of a printer. When a printer whose data is not input or another output device is selected, the name and resolution of the selected output device 5 are input, thus completing the setting operation. Other output devices include the color printer 6, and the indication device 8, the image recording device 9, the printer 10, and the like which are connected via the image transmitting and receiving devices 7 and 7a, as shown in FIG. 1.

Upon completion of the setting operation, an actual edit operation is started.

The edit operation is processed in correspondence with the contents input or instructed by an operator using the mouse or keyboard as the input device 3.

More specifically, upon completion of the initialization (S1), it is detected if the input device 3 is operated, and the operation contents are discriminated (S2, S6, S9).

The operation will be described in turn below. Upon detection of the key operation, it is checked in S2 if a key operation for image movement is performed. If Y (YES) in S2, the flow advances to the next step, i.e., processing (S3 and subsequent steps) for moving an image file. In the movement of an image file, an operator designates a required one of a plurality of image files in the image library memory 101. For example, the operator moves the pointer 100a shown in FIG. 4 to one (in this case, an image file b) of image files a, b, c, . . . stored in the image library memory 101 using the mouse 3, and selects the image file by clicking a button of the mouse 3 (S3). With this operation, it is determined that the key operation detected in S2 is performed for image movement. The designated image file b is set as a selected image file.

The operator then designates the paste position of the designated file in the edit area 402 (S4). This designation is attained by moving the pointer 100a while holding down the button of the mouse 3, i.e., by a drag operation. After the image file is moved to a desired position by the drag operation, the operator releases the button of the mouse, i.e., performs a drop operation.

Upon the drop operation of the mouse, the control portion 100 starts paste processing (S5).

[Image Paste Function]

Paste position processing (S5) upon pasting an image file will be described in detail below with reference to FIGS. 5 and 6. FIG. 5 is a flow chart of this processing, and FIG. 6 graphically shows the calculated values.

Figure 6:
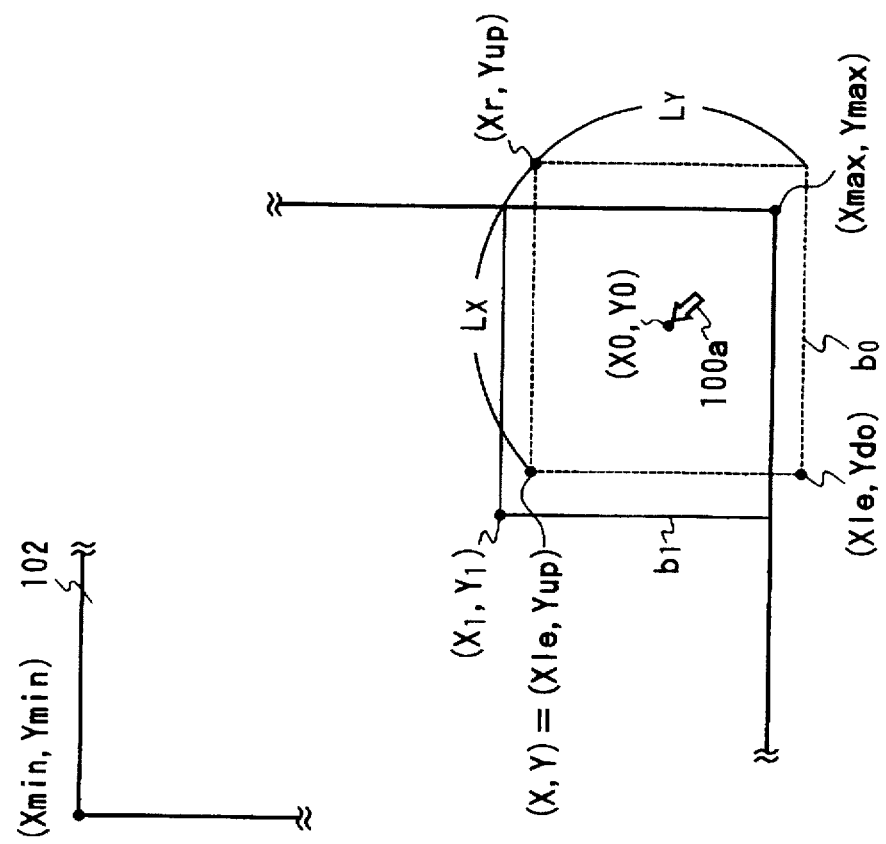
FIG. 6 is a view showing an example of the image plane of the indication device to explain the operation of the embodiment shown in FIG. 1.

Assume that the paste position (X0, Y0) of the image file b is designated by the pointer 100a, as shown in FIG. 6. As shown in FIG. 5, the control portion 100 acquires necessary data, so that the designated position (X0, Y0) is set as the center of the designated image file b (S50). The necessary data include the coordinate position (X0, Y0) in the edit area designated by the pointer 100a, the numbers of pixels (Ph, Pv), in the horizontal (X) and vertical (Y) directions, of the designated image file b, the resolution, Ro [dpi], of the output device, and the resolution, Rd [dpi], of the indication device 2 used.

The control portion 100 substitutes the acquired data in formulas (1) below to calculate the paste size (the lengths, Lx and Ly, in the respective directions) of the image file b into the edit area 402 in correspondence with the resolutions of the output device and the indication device (S51).

$$Lx = Px \cdot Rd/Ro$$

$$Ly = Py \cdot Rd/Ro \qquad (1)$$

After the lengths Lx and Ly, in the respective directions, of the image file on the image plane are calculated, the control portion 100 then calculates a paste reference position (X, Y) where the image file b is to be pasted (S52).

$$X = X0 - (Lx/2)$$
$$Y = Y0 - (Ly/2) \quad (2)$$

Note that a range b0 indicated by a dotted line in FIG. 6 corresponds to the position of the image file when the image file b is pasted at the reference position (X, Y) calculated using formulas (2) above upon designation of the paste position (X0, Y0).

The control portion 100 calculates the coordinate positions of the left end Xle, right end Xr, upper end Yup, and lower end Ydo of the image file to be pasted using formulas (3) below so as to prevent the image file b from extending outside the edit area upon pasting of the image file b. Then, the control portion 100 compares the coordinate positions of the calculated left end Xle, right end Xr, upper end Yup, and lower end Ydo with the frame (Xmin, Xmax, Ymin, and Ymax) of the edit area (S53).

$$Xle = X$$
$$Xr = X + Lx$$
$$Yup = Y$$
$$Ydo = Y + Ly \quad (3)$$

If it is determined as a result of comparison that the calculated coordinate positions Xle, Xr, Yup, and Ydo extend outside the frame of the edit area, the control portion 100 calculates the differences between these coordinate positions and the coordinate positions of the frame using formulas (4) below. The control portion 100 corrects the paste reference position by the differences to obtain a corrected reference position (X1, Y1) (S54).

$$X1 = Xmin \ (Xmin \geq Xle)$$
or
$$Xmax - Lx \ (Xr \geq Xmax)$$
$$Y1 = Ymin \ (Ymin \geq Yle)$$
or
$$Ymax - Ly \ (Yr \geq Ymax) \quad (4)$$

On the other hand, if it is determined as a result of comparison in S53 that the calculated coordinate positions Xle, Xr, Yup, and Ydo fall within the frame of the edit area, and if the corrected reference position (X1, Y1) is calculated in step S54, the control portion 100 pastes the image file b with reference to the paste reference position (X, Y) or the corrected reference position (X1, Y1) (i.e., into a range b1 indicated by a solid line in FIG. 6). In FIG. 6, when the image file is pasted at the paste reference position (X, Y) with reference to the position designated by the pointer 100a, the image file extends outside the edit area as the range b0 indicated by a dotted line. Thus, the image file is pasted with reference to the corrected reference position (X1, Y1).

Therefore, the position of the pasted image file b corresponds to a range b1 enclosed by a bold rectangle. In the case of the image file b (HAPPY NEW YEAR) shown in FIG. 4, it is determined in S53 that the image file falls within the edit area 402, and the image file is pasted with reference to the reference position (X, Y) without correction.

Although not shown, irrespective of whether the paste position is designated at the position shown in FIG. 6 or at any other positions in the edit area, the same processing as above is performed. Also, when a plurality of image files are to be pasted into a single edit area, the same processing is performed. In this case, if image files overlap each other, they are superposed so that the latest image file is present at the uppermost position. Note that superposed image files can be changed in superposed order by selecting a non-overlapping portion of the lower image file, and then selecting it as an image file to be pasted at the uppermost position using a paste order change command in the menu bar 102a. Thus, the image files can be freely moved after they are pasted.

When the image file is pasted into the edit area 402, as described above, the paste processing (S5) shown in FIGS. 3A and 5 ends, and the control waits for the next key operation. Therefore, the paste operation of the next image file, or the enlargement/reduction operation and image processing (to be described below) of the pasted image can be performed.

The operation upon pasting of an image has been described. When a pasted image is to be moved to another position in the edit area, an image file to be moved on the edit area is selected, and its paste position can be designated (S4). In this case as well, the processing in S5 is performed on the basis of the designated position, and the paste position is changed.

[Character Paste Function]

A case will be described below wherein a character is pasted into the edit area 402 by the key operation. Characters which can be recognized by an operator on the edited image (indication image plane) are classified into two types. That is, they can be classified into a special character or character group input as an image, and a normal character or character group input using a wordprocessing function. The former characters are those stored as an image in the image library like letters "HAPPY NEW YEAR", as shown in FIG. 4. The special image character or character group is considered as a kind of image, and is processed in the same manner as the image edit operation.

As to the normal character or character group, when a key operation is performed upon input of a character to be input using a character input device such as a keyboard, it is determined that a character is input (S6), and the input character is indicated on the edit area (S7). After the input character is indicated, it is checked if another character input operation or another key operation is performed (S8). Depending on the determination result, the flow returns to the character input processing (S7) or the key operation determination processing (S2 and subsequent steps). Conversion, selection, and the like of the input character may be realized using various methods (devices). For example, a keyboard input, a handwriting pen input, speech recognition, or the like may be used.

[Image Enlargement Function]

The enlargement/reduction (resize) function of an image will be described below with reference to FIGS. 3A, 3B and 7. For the sake of easy understanding, assume that an image is resized while preserving the aspect ratio of the image file.

The resize processing is started by moving the pointer 100a using the mouse, and clicking the edge of one of image files to be resized that is pasted in the edit area by the pointer (of course, an image resize command in the menu bar 102a may be selected).

In the procedure at that time, the control portion 100 detects the movement of the pointer 100a on the edit area. When the mouse button is clicked again after it is determined in S2 and S6 that neither an image paste operation nor a character input operation are to be performed, the control portion 100 recognizes that command processing is to be performed (S9). Then, the control portion 100 detects whether an image file or the menu bar 102a is clicked (S10). If the menu bar 102a is clicked, processing corresponding to the selected command (S23) is performed. Note that this processing includes all the processing operations which can be selected using the menu bar 102a. In the case of the resize processing discussed above the flow advances to S4 for the image re-movement (paste) operation, S13 for the image resize operation, or S20 for image processing in correspondence with the selected command.

If it is determined in S10 that an image file is selected, it is then detected if the clicked position is one of the four corners of the image file (S11). If the clicked position is other than the four corners, it is checked if the mouse button is double-clicked (S12). If the mouse button is double-clicked, the flow advances to the image processing (S20). On the other hand, if it is determined in S10 that the clicked position is one of the four corners, the flow advances to the image resize processing (S13).

Figure 7:
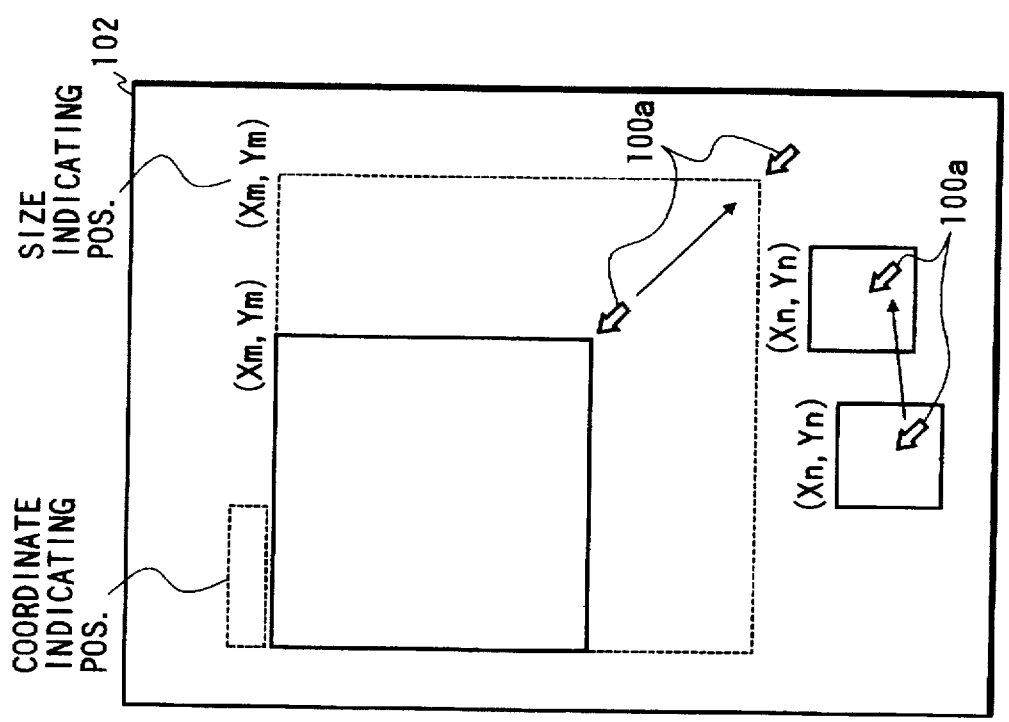
FIG. 7 is a view showing an example of an edit area to explain the operation of the embodiment shown in FIG. 1.

Therefore, when an image file is to be resized, one of the four corners of the image file to be resized need only be clicked, as indicated by the pointer 100a in FIG. 7. In this case, the pointer 100a must be moved while clicking (holding down) the mouse button after the clicking operation (i.e., starting the drag operation) so as to maintain the clicked state. In the resize processing, any one of the four corners can be selected, and the resize processing is performed with reference to the corner on the diagonal line of the selected corner. Normally, these four corners are called corner handlers, and are indicated in small square dot patterns to be discriminated from other edges.

When one of the four corners is clicked, the clicked image file is indicated at the uppermost (top) position on the indication image plane to represent that the clicked file is selected, and the corner handlers are also indicated.

When the operator confirms that the clicking operation is recognized, he or she moves the position of the pointer to a desired enlarged or reduced size position, thus designating an enlargement range. When the pointer is moved to the desired enlargement range position, the operator releases the clicked state (performs a drop operation) (S13). At this time, as shown in FIG. 7, the length and width (in practice, the vertical and horizontal intervals between the corresponding corner handlers) of the image itself are indicated at the upper right position above the image file to be resized in the edit area. Therefore, when the operator wants to set a desired size, he or she can perform the resize operation while observing the image size indication.

As shown in a lower portion in FIG. 7, upon movement of an image file, the coordinate position of the reference position (the upper left corner of an image file in this embodiment) of an image file is indicated at the upper left position above the image file. Therefore, whether the image movement operation or the image resize operation is being performed can be identified by indicating the coordinate position or the size (length and width). In addition, in this embodiment, since the size is indicated at the upper right position and the coordinate position is indicated at the upper left position, the operator can determine the current operation on the basis of the indicated position of numerical values. When the size or coordinate position cannot be displayed above the image file, e.g., when the upper end of the image file is located near the upper end of the edit area, the size or coordinate position is indicated below (at the lower right or lower left position) the indicating position of the image file.

When a new size for the resize processing is designated, the control portion 100 determines the enlargement (or reduction) factor of the image file in correspondence with the designated enlargement range. More specifically, the control portion 100 calculates the ratio between the sizes of the image file before and after designation of the range. At this time, since the image file is enlarged while preserving the aspect ratio of the image file, a smaller one of the vertical and horizontal enlargement factors is appropriately adjusted to preserve the aspect ratio in correspondence with the larger enlargement factor.

After the enlargement factor is determined, the resolution of the output device 5 is compared with that of the enlarged image so as to prevent a decrease in resolution due to excessive enlargement upon enlargement to the designated range.

The number of pixels (resolution) Rw [dpi] per inch of the enlarged image file is calculated, and is compared with the resolution Ro [dpi] of the selected output device (S14).

If it is determined as a result of comparison in S14 that the resolution of the enlarged image file is lower than that of the output device, an alarm operation is performed (S17). Subsequently, an alarm message including the cause of the alarm and choices for the subsequent processing to be performed is indicated. In the alarm operation, a predetermined sound is output from a built-in loudspeaker of the computer 1 (of course, an alarm may be generated by another method, e.g., a method of turning on an alarm lamp by changing the color of the image plane). In the sense that an alarm is generated, the alarm message indicated thereafter can be considered as the alarm operation.

The choices indicated in the alarm message allow selection as to stop or proceed with the processing or to perform optimizing processing for enlarging an image within a range free from a decrease in resolution, and the selected processing is performed.

When the processing is to proceed, the enlargement processing of the image is performed based on the enlargement range designated in S13, and the enlarged image is pasted into the edit area. In this case, the resolution of the edit area on the indication device is normally lower than that of the output device. For this reason, an image indicated on the indication device normally does not look as one with a low resolution, but the resolution of an actually output image is lowered. More specifically, when an edited image is output from the output device, a decrease in resolution of an image is inevitable.

In the optimizing processing, the size of the image file is set so that the resolution Ro [dpi] of the output device is equal to the resolution Rw [dpi] of the enlarged image file. In this case, the enlarged size is limited depending on the resolution of the image. Therefore, a high-resolution image is preferably registered as an image to be enlarged in the image library, so as to output a sharp enlarged image.

When the processing is to be stopped, the image file before designation of the enlargement range is pasted into the edit area, and the control waits for a key input (S2).

If it is determined as a result of comparison in S14 that the resolution of the enlarged image file is higher than that of the output device, the original image file is enlarged, and is pasted into the edit area (S15).

The processing upon enlargement of an image has been described. Since processing for reducing an image can be realized by setting a negative enlargement factor, processing upon reduction of an image is known to those who are skilled in the art, and a detailed description thereof will be omitted.

[Image Processing Function]

The image processing will be described below with reference to FIGS. 3A, 3B and 8.

When the image processing is started, the pointer 100a is moved by operating the mouse so as to select an image file to be processed in the edit area. When an image file to be processed is double-clicked, the double-clicking operation is recognized via the decision steps S9, S10, S11, and S12, and an image processing window (image processing area) 104 is indicated (S20). The image processing window 104 is indicated in a size at which one pixel of the indication device equals one pixel in the image processing window (normally, the image processing window is indicated at a larger enlargement factor than that of the image file in the edit area). At the same time, as shown in FIG. 8, the contents of the menu bar 102a indicated above the edit area in FIG. 4 are changed to those of a menu bar 104a for performing the image processing. In this embodiment, the menu bar 102a or 104a is indicated above the edit area to reduce the moving amount of the pointer 100a to the menu bar. Alternatively, like in other computers or software programs, the menu bar may be indicated on an upper portion 2a of the indication image plane or on a bar 104b of the image processing window.

Although various kinds of processing may be performed, the image processing to be performed in this case includes color adjustment processing for changing the color of an image, image emphasis processing for emphasizing an image by adjusting the density of an image, reversal processing for reversing the density of an image, and the like.

Note that a normal image processing software program and an image processing apparatus are designed to attain various kinds of image processing to allow fine adjustment. However, image processing performed by the control portion 100 is only processing consistently performed for the entire image file. That is, very complicated image processing for, e.g., locally changing the color of a portion from black to red cannot be performed. However, the operation is simple. In addition, since only consistent processing is performed, the image processing itself can be easily realized within a short period of time.

When desired image processing is performed, an image indicated on the indication device changes in correspondence with the selected image processing (S21). A description of the contents of each image processing will be omitted herein. In this embodiment, since one pixel of the indication device is set to be one pixel of the image file, an image can be checked up to its details, and fine adjustment can be easily realized while observing an image subjected to the image processing. Upon completion of a series of selected image processing operations, an end alarm message is indicated, and the operator selects to end the processing or to perform another image processing (S22).

[Other Command Processing Function]

If it is determined in S9 that the contents of the key operation correspond to a command operation, i.e., if a portion other than an image file is designated or a key operation is performed, other command processing (S23) is performed. For example, operations in this case include an operation for switching the key mode of the keyboard to the Japanese mode to input a document in Japanese, a command for deleting or saving an edited image created in the edit processing, and the like. Some commands require a series of operations, and after it is confirmed if the command processing is repetitively performed (S24), the control waits for a key input in S2.

The flow of the flow chart of the image edit mode described above is a typical example. For example, in each procedure, the control portion 100 always monitors if a key operation is performed, independently of the procedure. When a key operation is performed, the control portion 100 preferentially executes the processing corresponding to the key operation. Therefore, after the image processing window is displayed (S19), when the window of the edit area is selected using the mouse before execution of the image processing (S20), the edit operation (e.g., S2) can be started. In this manner, the flow of the processing can be changed or modified as long as a computer which allows parallel processing using another indication image plane is used.

[Image Output Mode Function]

The image output mode will be described below. After a desired edited image is created in the image edit mode, when the operator selects an output command from the processing menu provided on the menu bar 102a using the input device 3, the edited image file is output. Upon reception of this command, the control portion 100 performs output control as the function of the other command processing in the flow charts shown in FIGS. 3A and 3B. In the output control, a setting operation is performed in correspondence with the output device. Since the type of the output device has already been selected in the setting mode before the edit operation, other fine parameters are set in correspondence with the selected output device. For example, if the output device is the sublimation digital color printer 5 shown in FIG. 1, the number of prints, whether or not a double-sided print operation is performed, and the like must be designated. In correspondence with the set condition, the computer 1 outputs a control signal and data of the edited image file to the output device. The output device outputs an image on the basis of the transmitted data. More specifically, the digital color printer 5 prints (outputs) an edited image on a paper sheet corresponding to the size of the edited image file on the basis of transmitted digital data.

As described above, the image edit method and apparatus according to the present invention can provide the following effects.

In association with the image edit method:

According to one embodiment of the present invention, since the image edit method of the present invention is one for determining the size of an image file to be pasted into the edit area in correspondence with the resolution of the output device or means, an edited image can be output at the resolution of the output device without requiring any complicated operations. Therefore, the edit operation can be performed using an image with a high resolution, and a wasteful operation such as a re-edit operation for adjusting a low-quality image can be eliminated. Furthermore, a problem that an image which looks good on the indication device has a low resolution as a result of an output operation by the output device can be prevented. Since the size of an image file is determined to have a resolution equal to that the output device, a large image file with a high resolution can be edited. In order to maintain the resolution, when the resolution of the image file is higher than that of the output device, the file size decreases, but the resolution of an output image can be maintained.

According to another embodiment of the present invention, the resolution of the image file is compared with that of the output device. When the resolution of the output device becomes higher than that of the image file, an alarm is generated. For this reason, the resolution of the enlarged image file can be prevented from becoming lower than that of the output device without the operator's knowledge. When an alarm is generated, since one of the image processing step of enlarging an image at the cost of resolution, the optimizing step of setting a maximum size while maintaining the resolution, and the stop step of stopping the enlargement processing can be selected, the operator can select whether the resolution or size is maintained or the processing is stopped depending on his or her preference. Therefore, the state of an image can be recognized before it is output from the output device, resulting in a smooth edit operation.

According to still another embodiment, the reference position for pasting an image in the paste step is offset to prevent an image file to be pasted into the edit area from extending outside the edit area. For this reason, the paste position of the image file can be designated relatively roughly, i.e., easily, thus allowing an easy edit operation.

Furthermore, according to still another embodiment, upon designation of the paste position of the image file, the paste reference position is offset so that the designated paste position coincides with the center of the image file, and the image file is pasted at the offset position. For this reason, upon pasting of the image file, the paste position can be designated in consideration of the position of the center of the image. Therefore, the paste position of the image file can be designated at a desired position regardless of the difference between a mark (e.g., the pointer 100a in the above embodiment) which is normally indicated for designating the paste position, and the reference position where the image file is pasted, and the size of the image file. In other words, since a conventional apparatus adopts a method of designating the upper left position of an image file, the paste position must be designated in consideration of the developed state of the image file. However, according to the present invention, by roughly designating the central position upon development of an image file, since the file can be developed to have the designated point as the center, the operator need not consider the developed state of an image. Therefore, an image file can be easily pasted at a desired position.

According to still another embodiment, when an image file pasted into the edit area is selected, the size of the image file is determined so that the resolution of the image file becomes equal to that of the indication means, and the image file is indicated in the determined size. For this reason, the operator can obtain the information of an image file up to its details. Therefore, upon execution of image processing of an image file, the image can be checked up to its details. Even when the image processing is not performed, the state of an image file output by the output device can be confirmed.

In association with the image edit apparatus:

According to one embodiment of the present invention, the edit area control means controls the size of an image file in correspondence with the resolution of the output means upon pasting of an image file into the edit area. For this reason, the resolution of the image file can be prevented from becoming considerably lower than that of the output means. Therefore, the image edit operation can be performed without impairing the resolution of the image file. When the size of the image file is set so that resolution of the image file is equal to that of the output means, a large image file can be edited without impairing the resolution. In order to maintain the resolution, the size of the image file can be set so that the resolution of the image file is higher than that of the output means.

According to another embodiment of the present invention, the resolution of the image file is compared with that of the output means. When the resolution of the output means becomes higher than that of the image file, an alarm is generated. For this reason, upon execution of enlargement processing of an image file, the resolution of the image file can be prevented from inadvertently becoming lower than that of the output means. When the alarm is generated, whether to proceed with the enlargement processing, to optimize the size to prevent a decrease in resolution, or to stop the processing can be selected. In this case, the operator can select the size or image quality (resolution) according to his or her preference while confirming an image, resulting in a smooth edit operation.

Furthermore, according to still another embodiment, since the paste reference position is offset to prevent an image file to be pasted from extending outside the outer frame, the paste position of the image file can be relatively roughly designated, thus allowing a smooth edit operation.

According to still another embodiment, when an image file is designated, and the paste position of the designated image file is designated, the image file is pasted so that the designated paste position coincides with the center of the image file. For this reason, upon designation of the paste position, the edit operation can be performed regardless of the difference between the designated position and the center of the image to be pasted unlike in the conventional apparatus, thus allowing an easy edit operation.

According to still another embodiment, when an image file pasted in the edit area is selected, the size of the image file is determined, so that the resolution of the image file becomes equal to that of the indication means. The image file is indicated in the determined size on the indication means. Therefore, upon execution of the image processing of the image file on the edit area, the image file can be confirmed up to its fine details, so that the image processing result can be accurately confirmed. Also, the image quality of an image file when it is output by the output means can be confirmed.

What is claimed is:

1. An image edit method for forming, using an image edit apparatus comprising an indication device which indicates an image, an edited image file by pasting an image file into an edit area indicated on said indication device while observing the edit area, said apparatus being constructed to output the edited image file to an output device, comprising:

an enlargement designation step of designating an enlarged size of an image file pasted in the edit area;

a comparison step of comparing an image resolution of the image file whose size is designated in the enlargement designation step with a resolution of said output device; and an alarm step of generating an alarm when it is determined in the comparison step that the resolution of said output device becomes higher than said image resolution.

2. A method according to claim 1, further comprising:

a selection step of selecting one of an enlargement processing step, an optimizing step, and an enlargement stop step after the determination in the comparison step, wherein the enlargement processing step performs enlargement processing of the image file whose size is designated in the enlargement designation step to obtain an image file with the enlarged size designated in the enlargement designation step; the optimizing step optimizes a size of the image file whose size is designated in the enlargement designation step to a size having a resolution substantially equal to that of said output device; and the enlargement stop step stops enlargement processing of the image file whose size is designated in the enlargement designation step and restores the size of the image file to a size before designation.

3. A method according to claim 2, wherein said selection step selects in response to the determination in said comparison step.

4. A method according to claim 3, wherein the selection step selects after the alarm step.

5. An image edit apparatus for forming an edited image file by pasting an image file into an edit area indicated on an indication means for indicating an image while observing the edit area, and for outputting the edited image file to output means, comprising:

- enlargement designation means for designating an enlarged size of an image file pasted in the edit area;
- comparison means for comparing an image resolution of the image file whose size is designated by said enlargement designation means with a resolution of said output means; and
- alarm means for generating an alarm when said comparison means determines that the resolution of said output means becomes higher than the image resolution.

6. An apparatus according to claim 5, further comprising:

- enlargement processing means for performing enlargement processing of the designated image file to have the enlarged size designated by said enlargement designation means;
- optimizing means for optimizing the size of the image file whose size is designated by said enlargement designation means to a size having a resolution substantially equal to that of said output means;
- enlargement stop means for stopping the enlargement processing of the image file whose size is designated by said enlargement designation means, and restoring the image file to a size before designation; and
- selection means for selecting one of said enlargement processing means, said optimizing means, and said enlargement stop means after the determination by said comparison means.

7. An apparatus according to claim 6, wherein said selection means selects in response to the determination by said comparison means.

8. An apparatus according to claim 7, wherein said selection means selects after the alarm is generated by said alarm means.

\* \* \* \* \*